Patented Mar. 31, 1936

2,035,578

UNITED STATES PATENT OFFICE 2,035,578

SYNTHETIC RESIN

Frederick Carver Wagner, Wilmington, Del., assignor to E. I. du Pont de Nemours & Company, Wilmington, Del., a corporation of Delaware No Drawing. Application April 1, 1933,
Serial No. 664,032

24 Claims. (Cl. 260—2)

This invention relates to synthetic resinous compositions and more particularly to a new type of resin, obtainable by reacting a polyhydric phenol or metal salt thereof with an organic polybasic acid halide, with or without monohydric phenols and organic monobasic acid halides.

It should be understood that this invention is not concerned with the phenol-aldehyde resin-forming reaction and has no relation to the extensive art dealing with the formation of such resins, or with their after-treatment. Although the new synthetic resins which are the subject of this invention are prepared from a particular type of phenol (such as a phenolic material having two phenolic hydroxyl groups), the present resin-forming reaction is a modified form of esterification, and the resins of this invention are of a new ester-type, not phenol-aldehyde or modified phenol-aldehyde resins. In the prior art processes are described in which phenols are combined with aldehydes in the presence of various halogen compounds; such processes have no relation to the present invention in which aldehydes are not employed as resin-forming ingredients. Methods are also known in the resin art for treating partially or completely condensed phenol-aldehyde resins with various organic halogen compounds; such processes yield modified phenol-aldehyde resins and not ester resins of the present type.

This invention has as an object new and improved synthetic resins. A further object is a process for making the new resins. A further object is a method by which polyhydric phenols can be made to combine with organic polybasic (polysulfonic, polycarboxylic, or sulfonic-carboxylic) acid derivatives to form resins built up of ester-like linkages. A still further object is the production of improved coating and other compositions. Other objects will appear hereinafter.

These objects are accomplished by reacting a polyhydric phenol, or a metal salt thereof, with the acid halide of an organic polybasic acid. As used herein, the term "organic polybasic acid halide" is an organic compound having at least two

groups, or at least two

groups, or at least two

groups, where X is a halogen atom. This term also includes organic compounds having one or more groups of more than one of the above types, such as a compound having a COCl group and an $SO_2Cl$ group. The term "organic monobasic acid halide" refers to an organic compound having one of the groups just mentioned.

The term "polyhydric phenol" designates an organic compound having at least two phenolic hydroxyl groups, and the term "monohydric phenol" refers to an organic compound having one phenolic hydroxyl group.

Generally speaking, the new resins can be satisfactorily prepared by adding the polybasic acid chloride slowly to an aqueous or sometimes alcoholic solution of the sodium salt of the polyhydric phenol, warming to boiling if necessary to complete the reaction, neutralizing any unchanged acid chloride with alkali, washing the resin free of metallic halide, and drying in vacuo at elevated temperature. Other metallic salts such as those of lithium, potassium, calcium, barium, and strontium, and other acid halides such as bromide and iodide can also be used, but for economic reasons the sodium salt and the acid chloride are preferred. Salts of the alkali metals such as sodium and potassium are also preferred for reasons of solubility. The phenol or phenol mixture is generally dissolved in the theoretical amount of alkali (that is, one mole of sodium hydroxide for each phenolic hydroxyl group present) although in some cases, for example where the reaction tends to be too vigorous for proper control, less alkali suffices. In other cases, excess alkali will diminish losses of ingredients suffered in side reactions, e. g. the formation of crystalline fluorescein-type compounds. It is desirable, in order to obtain a resin of maximum water resistance, not to deviate too far from equivalent proportions of phenol and acid halide. For example, one mole of dihydric phenol requires one mole of a dibasic acid halide; one mole of a trihydric phenol requires one and one-half moles of a dibasic acid halide; etc.

Another equally good and sometimes better way of making the new resins is in a non-aqueous medium such as an inert organic solvent, for example a hydrocarbon. In this case the phenol itself may be used instead of its sodium salt which is generally insoluble in the organic solvent; this generally necessitates a relatively high reaction temperature, e. g. in the range 75–150° C. or even higher. In addition, a small amount of an HCl-acceptor, such as pyridine or other organic amine, may be used to initiate or catalyze the reaction. Suitable solvents are aromatic hydrocarbons such as benzol, toluol, xylol and "Hi-flash Naphtha"; mixtures of aliphatic and aromatic hydrocarbons, especially for those cases where aliphatic acid halides are used; ethers such as anisol or mixtures of anisol and dibutyl ether; and chlorinated solvents such as ethylene dichloride and chlorobenzene. The solvent used should be non-reactive toward the acid halide and phenol under the conditions of resinification. The aromatic hydrocarbons are generally preferable since the polyhydric phenols are more readily soluble therein. If dissolved thus in a solvent, neutralization after resinification can be accomplished easily by stirring with dilute alkali. The resin solution is then washed with water and dried by distilling off a small amount of solvent. If the solid resin is desired instead of the resin solution, all of the solvent can be removed by distillation, the last portions preferably in vacuo. The organic solvent method is possibly best adapted to the more reactive acid halides such as those of aliphatic polybasic acids which have a tendency to combine to an appreciable extent with the otherwise aqueous or alcoholic medium.

From the following expressions,

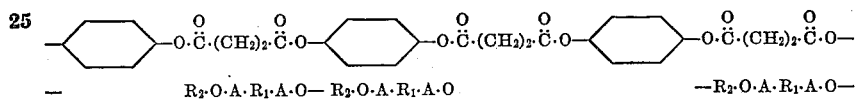

which indicate the kind of product obtained by reacting a simple polyhydric phenol and polybasic acid halide represented by hydroquinone and succinyl chloride, it will be seen that my new resins have a recurrence of $-R_2 \cdot O \cdot A \cdot R_1 \cdot A \cdot O-$ groups, or units of chemical structure. The various symbols can be defined generally as follows: "O" is oxygen; "$R_2$" is a bivalent organic radical joined to the two adjacent oxygen atoms through aromatic carbons; "A" is chosen from the group consisting of

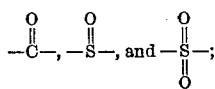

and "$R_1$" is a bivalent aliphatic or aromatic hydrocarbon radical. The preferred types of resins, however, are those in which

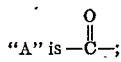

these resins are derived from the polycarboxylic acid halides and can be formulated as having a recurrence of the structural unit

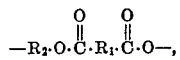

$R_1$ and $R_2$ being defined as above.

The invention is illustrated more specifically by the following examples, in which the parts are by weight.

*Example I*

One mole of resorcinol (110 parts) is dissolved in a solution of two moles (80 parts) of sodium hydroxide in 1000 parts of water (7.5% solution). One mole (203 parts) of phthalyl chloride is added dropwise to this solution, with efficient agitation. The solution gradually warms up and a pasty mass separates which gradually becomes resinous. Stirring is continued for one-half to one hour after the phthalyl chloride is added, the temperature gradually being brought to boiling. The aqueous layer which contains some fluorescein is decanted, the resin is washed several times with hot water (conveniently in a steam-heated Werner and Pfleiderer mixer), then with small portions of dilute alkali until the washings are neutral or slightly basic, and finally with water again. The resin can be dried by heating in vacuo, or the water can be removed by dissolving the resin in toluene and distilling off a small amount of the solvent. In the latter case the toluene solution can be filtered to remove suspended material. This resin is a yellow, somewhat brittle thermoplastic product, soluble in toluene and alcohol. An excess of alkali is desirable in preparing this resin inasmuch as this causes the fluorescein, which is obtained as a by-product but is also a polyhydric phenol, to enter into resin formation.

The resorcinol of the above example is typical of the class of mononuclear polyhydric phenols, any member of which may be used instead of the resorcinol. For example, there may be used substituted resorcinols such as orcin (1-methyl-3,5-dihydroxy benzene), m-xylorcin (1,3-dimethyl-4, 6-dihydroxy benzene) and 1,3-dihydroxy-4-cyclohexyl benzene. The other dioxy benzenes, pyrocatechol and hydroquinone, are also suitable as well as their derivatives, such as hydrocumoquinone (1,2,4-trimethyl-3,6-dihydroxybenzene), and isopropyl pyrocatechol. As an example of a mononuclear heterocyclic dihydric phenol, α, α'-dihydroxy pyridine may be given.

Instead of mononuclear phenols there are numerous types of polynuclear phenols which can be used to make the new resins. Those of the naphthalene type, such as 2,6-dihydroxy-naphthalene and anthrahydroquinone form value resins, but those of the diphenyl type are generally preferred for my purposes. The simplest example of such suitable polynuclear phenols is p,p'-dihydroxydiphenyl. A more complex type is that in which the two aromatic nuclei are separated by intermediate atoms or groups of atoms. Of these, p,p'-dihydroxydiphenyl ether, p,p'-dihydroxydiphenylsulfide, p,p'-dihydroxybenzophenone, p,p'-dihydroxydiphenylsulfone, and p,p'-dihydroxydiphenyldisulfide are typical. These phenols have O, S, CO, $SO_2$ and S—S groups between the aromatic nuclei. It is not necessary that the phenolic hydroxyls in the above types of phenols be in the para positions; the p,p' compounds are named because they are more readily available.

The ring substituted derivatives of all these phenols are frequently used to advantage inasmuch as they impart greater solubility to the resins. Suitable substituted sulfones, for example, which are typical of all these substituted products, are as follows:

di(4-hydroxy-3-methylphenyl) sulfone
di(4-hydroxy-3,5-dimethylphenyl) sulfone
di(4-hydroxy, 3-methyl, 5-chlorophenyl) sulfone
di(4-hydroxy, 3-chlorophenyl) sulfone
di(4-hydroxy, 3,5-dichlorophenyl) sulfone These nuclear chlorine atoms, of course, do not enter into the condensation, and resins obtained from this class of polynuclear phenol having chlorine ring substituents are found to have a greater solubility in drying oils, for example.

Although the above types of polynuclear phenol (viz. those containing an intermediate oxygen, sulfur, etc., radical) form valuable resins, the preferred type for many purposes is that containing an intermediate secondary or tertiary carbon atom, inasmuch as resins obtained from such phenols are especially resistant to the action of light, i. e. do not discolor. The compound di(4-hydroxyphenol) dimethylmethane is typical. More specifically, this particular class of phenols is defined as a polynuclear phenol having a secondary or preferably tertiary carbon atom in the ortho or preferably para position to the phenolic hydroxyl groups. The preparation of one of my new resins from phenols of this class is illustrated in the following example:

*Example II*

One mole of sodium hydroxide (40 parts) is dissolved in 700 parts of water. One-half mole of a di(4-hydroxyphenoyl)-dimethylmethane (114 parts) is added to the alkali solution and any undissolved particles filtered off. To the alkaline solution of the phenol, which is placed in a vessel fitted with a stirrer and a reflux condenser, is added one-half mole of phthalyl chloride (102 parts). The phthalyl chloride is added slowly inasmuch as reaction otherwise tends to be too vigorous. The solution warms up gradually and finally a pasty, resin-like mass is obtained. Stirring is continued for about one-half hour after all the chloride has been added, the temperature finally being carried almost to the boiling point. The aqueous layer is decanted and the plastic mass washed with water, then with dilute alkali until neutral, and finally with hot water again. The resin can be dried by heating in vacuo or by dissolving in toluene and distilling off a small amount of this solvent. The product is a hard brittle resin which is pale in color. This resin is insoluble in drying oils but soluble in alcohol, toluol, and many ester solvents. It is compatible with benzyl cellulose, with which it can be formulated into lacquers. It is saponifiable with alkali to yield a phthalate and phenolic bodies, including the original phenolic material. This latter property is typical of all the new resins.

Examples of suitable phenols related to that used in Example II are the following:
di(4-hydroxyphenyl) methylmethane
di(4-hydroxyphenyl) methylethylmethane
di(4-hydroxyphenyl) propylmethane
di(4-hydroxyphenyl) dipropylmethane
1,1-di(4-hydroxyphenyl) cyclohexane
di(4-hydroxyphenyl) phenylmethane
β-tertiary amyl resorcinol (i. e. 1-tertiary amyl-3,5-dihydroxy benzene)

Although the above phenols form very light resistant resins, these resins are frequently insoluble in drying oils and are not so generally useful as varnish resins. This defect can be overcome in many cases by using a phenol of this class which has ring substituents which may be halogen and/or alkyl groups. The following are typical of this class of phenol:
di(4 - hydroxy-3-chlorophenyl) dimethylmethane
di(4 - hydroxy-3-methylphenyl) dimethylmethane
di(4 - hydroxy - 3 - methyl -5-chlorophenyl) dimethylmethane
di(4 - hydroxy - 3,5 -dimethylphenyl) dimethylmethane
di(4 - hydroxy - 3,5 - dichlorophenyl) dimethylmethane Still another class of suitable dihydric polynuclear phenol is that of the phenolphthalein type, for example, phenolphthalein itself, resorcinphthalein, thymolphthalein, and the halogen derivatives of these compounds, such as eosin.

Instead of dihydric phenols, trihydric phenols may be employed. Pyrogallol and phloroglucinol may be given as examples of trihydric mononuclear phenols and the trihydroxy naphthalenes as examples of trihydric polynuclear phenols. Suitable tetrahydric phenols are the tetrahydroxy benzenes, biresorcin, the tetrahydroxydiphenyls and the hydroxyxanthones.

All phenolic materials that have two or more phenolic hydroxyls are suitable for the present resin-forming reaction except those phenolic bodies (e. g. certain polyhydric phenols having methylol groups) which on heat treatment are converted readily to infusible, insoluble bodies. It is obvious that such a transformation into an insoluble, infusible material by some other resin-forming reaction interferes with the formation of the ester-type polymers which are the subject of this invention. Therefore, the term "polyhydric phenol" is used throughout the present specification and claims to mean a phenolic body having at least two phenolic hydroxyls, which phenolic body is not readily converted on heat treatment to an infusible and insoluble product.

Passing next to the types of polybasic acid halides which can be used, there may be given the following in addition to phthalyl chloride: succinyl chloride, adipyl chloride, citric acid chloride, tricarballylic acid chloride, sebacic acid chloride, ketosuccinic acid chloride, hexahydrophthalyl chloride, itaconic acid chloride, the meta and para phthalyl chlorides, diphenic acid chloride, naphthalic acid chloride, and quinolinic acid chloride.

The following example illustrates the use of other acid chlorides than phthalyl chloride.

*Example III*

Two moles of sodium hydroxide (80 parts) is made up to 6.1% with distilled water. One mole of di(4-hydroxyphenyl)-dimethylmethane (228 parts) is added and any undissolved particles are filtered off. To the alkaline solution of the polyhydric phenol, in a vessel fitted with a reflux condenser, a thermometer, and a stirrer, is added dropwise one mole (184 parts) of adipic acid chloride over a period of about one hour. The contents of the reaction vessel warm up, and a dark oil separates, the color of which will depend upon the purity of the ingredients. After the addition of the adipyl chloride, the reaction mass is heated at refluxing temperature for 30 minutes. The aqueous layer is decanted, the pasty resinous product washed with hot water, then with dilute alkali until the washings are slightly basic and finally with several portions of hot water until the washings give only a faint cloud with silver nitrate. The resin can then be dried by heating in vacuo or by dissolving in toluol and distilling off a small amount of solvent. This resin differs remarkably from that prepared from phthalyl chloride and the same polyhydric phenol. The solid adipyl chloride resin has a lower melting point and is flexible at room temperature, whereas that from phthalyl chloride is hard and brittle. I believe this is to be due to the long aliphatic chain of the adipic acid chloride. The flexibilizing effect is not so great with succinic acid chloride which has a shorter chain of intermediate aliphatic carbons, and is more pronounced with sebacic acid chloride which has a longer chain of intermediate carbon atoms. For these and other reasons, the aliphatic acid chlorides having at least one intermediate carbon are preferred to the aromatic acid chlorides, and as shown by the results mentioned above with succinic, adipic and sebacic acid chlorides in which the halogen atoms are separated respectively by 2, 4 and 8 —$CH_2$-groups, it is particularly desirable to use the dibasic acid halides in which the two acid halide groups are separated by a divalent hydrocarbon radical containing a chain of at least 4 carbon atoms between the acid halide groups. Thus, the general formula for the halide is X—CO—$(CH_2)_n$—CO—X, wherein X represents a halogen atom and $n$ is at least 4.

It has been indicated that equivalent proportions of polyhydric phenol and poly-acid halide are preferred. By this is meant that 2 moles of a trihydric phenol will require 3 moles of a di-acid halide; 2 moles of a tri-acid halide will require 3 moles of a dihydric phenol; 1 mole of a dihydric phenol will require 1 mole of a di-acid halide; etc. In other words, the phenolic hydroxyls and halogens should be present in the same number. Variations from chemically equivalent amounts are not precluded, however, but the greater the variation (i. e. excess poly-acid halide or excess polyhydric phenol) the less desirable will be the resins, and when a certain highly unbalanced ratio is reached, a high molecular weight polymer cannot be obtained. In the case of a dihydric phenol and a diacid halide, for example, the molal ratio of the two compounds must not equal or exceed 2:1.

I have also found that the properties of the new resins can be varied over a wide range by replacing a portion of the polyhydric phenol by a chemically equivalent amount of a monohydric phenol and/or a portion of the polybasic acid halide by an equivalent amount of a mono-acid halide. Suitable monohydric phenols are phenol, cresols, xylenols, and parahydroxydiphenyl. Suitable monobasic acid halides are acetyl chloride, benzene sulfon chloride, stearic acid chloride, abietic and hydrogenated abietic acid chlorides, benzoyl chloride, and the acid chlorides of fatty acid mixtures, such as the mixture of acid chlorides from castor oil acids, cottonseed oil acids, China wood oil acids and linseed oil acids. Generally, the use of monohydric phenols and monobasic acid halides, particularly the latter, as resin ingredients changes the resin from what is frequently a hard, brittle and much less useful product to one which is tougher, more pliable and more soluble in a wider variety of solvents. Very often it induces or increases compatibility with cellulose derivatives and solubility in fatty oils, for example, linseed oil. Specifically, the acid chlorides of drying oil acids impart a very valuable property in that the organic radicals so introduced into the resin impart to it the property of drying to a hard film by an oxidation process.

My observations on the nature of the resins of the type disclosed herein and the effects of various monohydric phenols and monobasic acid halides has made it possible to predict roughly the properties of the new resins on the basis of the nature and amount of the ingredients going into their formation. The polyhydric phenol factor produces a fairly constant effect on the toughness, hardness, and solubility of the resin since it always contains at least one aromatic nucleus. (Minor changes can be brought about, however, by selecting phenols having aliphatic carbons between nuclei, or phenols having aliphatic and halogen ring substituents, etc.) The replacement (all references to replacement being in terms of chemically equivalent amount) of a portion of the polyhydric phenol by a monohydric phenol lowers the softening point of the resin. The nature of the acid halide has considerable effect on the flexibility and softening point of the resin. The aromatic polycarboxylic acid halides produce the extreme in hard and brittle resins. The replacement of a part of the aromatic polybasic acid halide by an aromatic monocarboxylic acid halide lowers the softening point of the resin but does not greatly affect its flexibility unless the mono-acid halide has long chain aliphatic ring substituents. However, the replacement of a part of the polycarboxylic acid halide by an aliphatic acid halide both lowers the softening point and increases the flexibility, this increase depending directly upon two elements of chemical constitution of the monocarboxylic acid chloride: (1) the number of aliphatic carbon atoms and (2) the presence of branched chains, but more upon the former. For example, stearic acid chloride has more flexibilizing effect than caprylic acid chloride, and isolvaleric acid chloride more effect than valeric acid chloride. The acid chlorides of drying oil acids produce in addition a special effect, viz. that of drying by oxidation. As already pointed out, the aliphatic polycarboxylic acid halides produce a fairly hard resin whose flexibility will depend upon the length of the carbon chain between the COCl groups. The softening points of these resins, as pointed out above, can then be lowered in either or both of two ways: (1) replacing a portion of the polyhydric phenol by a monohydric phenol, or (2) replacing a portion of the polycarboxylic acid halide by a monocarboxylic acid halide. The first method may or may not affect the flexibility of the resin. The second method, if continued far enough, will eventually result in soft, balsamic or even syrupy products. Thus, it is seen that by a proper selection of ingredients I may obtain a resin of practically any consistency from very soft, balsamic type to extremely hard and brittle products. The toughness of the resin can also be controlled by selection of ingredients; and flexibility and adhesion in extended form to various surfaces (coating compositions) goes hand-in-hand with this property. Compatibility with cellulose derivatives (except benzyl cellulose type), solubility in many organic solvents (both as to type of solvent and range of dilution), and miscibility on heating with drying oils, e. g. linseed oil, depends on the percentage of non-benzenoid carbons in the ingredients which go into the formation of the resin, the higher percentages favoring these properties. The adipic acid chloride resins, e. g. are more soluble in alcohols and aliphatic hydrocarbons, more soluble in drying oils, and more compatible with nitrocellulose than the phthalyl chloride resins. Likewise, the valeric acid chloride modified phthalyl chloride resins are intermediate in these properties between the adipic acid chloride and unmodified phthalyl chloride resins.

An example of a resin in which a portion of polyhydric phenol is replaced by a monohydric phenol is as follows. This example also illustrates the use of the solvent method previously referred to.

*Example IV*

One mole phthalyl chloride (203 parts) is added dropwise to a refluxing toluol solution of ⅞ mole di (4-hydroxyphenyl) dimethylmethane (199.5 parts) and ¼ mole o-cresol (27.0 parts) accompanied by efficient agitation. Copious fumes of hydrogen chloride are evolved. The solution is refluxed for 2-4 hours after the addition of the phthalyl chloride. It is cooled to room temperature, washed with water, then with dilute alkali until the washings are faintly basic, and finally with water until the washings give a negative test for chlorine ion. A small amount of toluol is then distilled off to dry the solution. If the solid resin is desired, the remainder of the toluol can be removed by distillation, the last traces preferably in a vacuum oven in shallow trays. This resin is soluble in aromatic hydrocarbons and in alcohol-toluol mixtures. It is light reddish-brown in color, hard and somewhat friable; however, it melts lower than the resin of Example II.

In the preparation of these resins by the solvent method, as just illustrated, the tendency toward formation of crystalline by-products is often greatly lessened and frequently entirely eliminated. If the resin of Example IV is prepared in an aqueous medium, an appreciable amount of a white solid is formed which decreases the yield, whereas if carried out as in Example IV, the loss sustained on discarding the aqueous layer is avoided.

An example of a resin in which the polycarboxylic acid chloride is replaced in part by a monocarboxylic acid chloride is as follows:

*Example V*

One mole of di(4-hydroxyphenyl) dimethylmethane (228 parts) is dissolved in 2 moles (80 parts) of 7.5% sodium hydroxide, any undissolved particles being filtered off. A mixture of ⅞ mole o-phthalyl chloride (177.5 parts) and ¼ mole benzoyl chloride (35.0 parts) is added dropwise at room temperature with stirring. The solution warms up to about 50–55° C. with the addition of the chloride mixture and brown oily drops, which gradually become a single resinous mass, separate. The reaction mass is refluxed for ½ hour after all the chloride mixture is added. The aqueous layer is decanted and the resin neutralized, washed, and dried in the usual way. This resin is partially soluble in China-wood oil, whereas the unmodified resin is completely insoluble. The use of an aliphatic monocarboxylic acid chloride, e. g. stearic acid chloride, as a modifier instead of benzoyl chloride, results in a resin which is still more soluble.

The substitution (in chemically equivalent amounts) of a monofunctional component for a part of the corresponding polyfunctional component (i. e. a monohydric phenol for a part of the polyhydric phenol or a mono-acid halide for a part of the poly-acid halide) can be carried too far, or to such an extent that the resin-forming reaction is completely blocked. This principle can be more readily appreciated by reference to the following relationships, which represent the dividing lines:

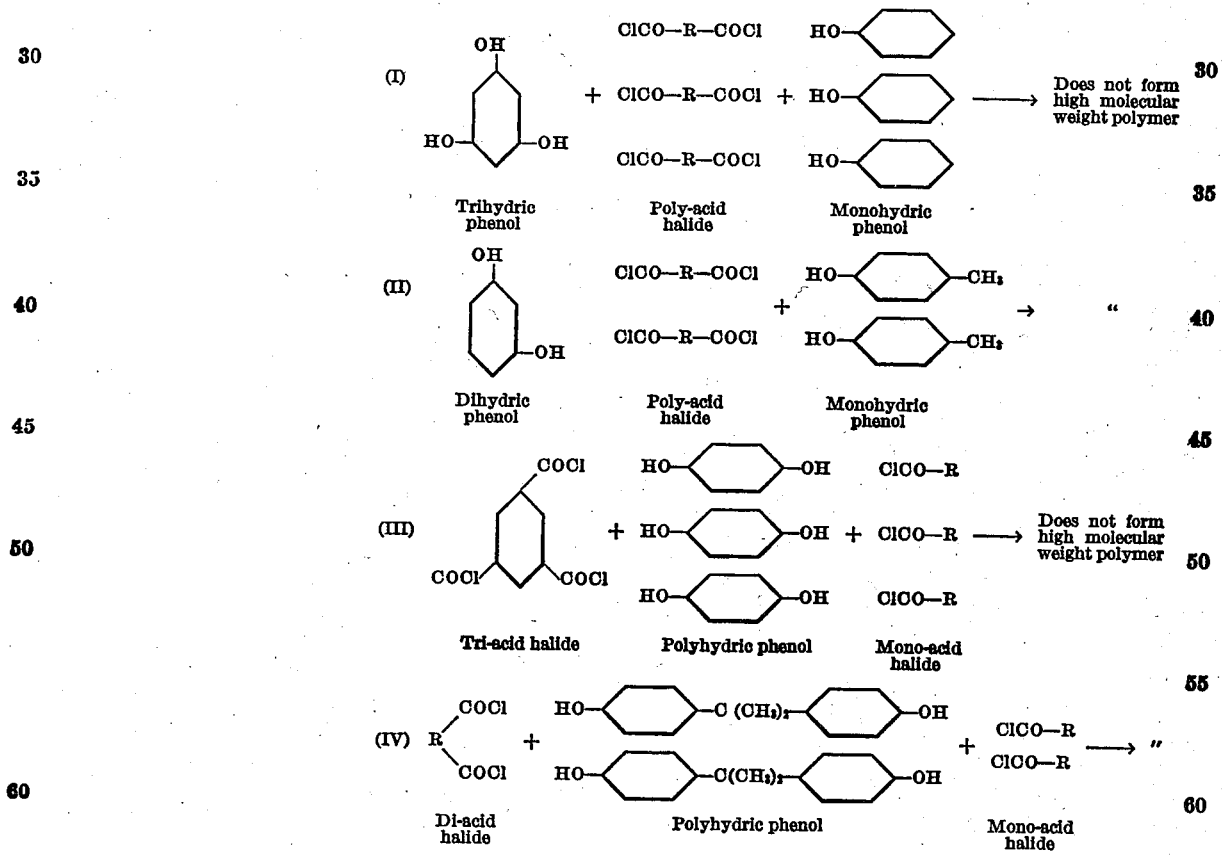

In cases (I) and (II) the molal ratio of monohydric phenol to di-acid halide is 1:1. Where this ratio is 1:1 or greater, highly polymeric materials cannot be obtained by the present resin-forming reaction. Another way of expressing this limiting proportion of monohydric phenol is that the ratio of moles of monohydric phenol to phenolic hydroxyls in the polyhydric phenol shall be less than 1:1; if this ratio is 1:1 or greater, it can be seen that the use of any proportion of di-acid halide will not cause the desired resin formation to take place. Likewise, in cases (III) and (IV) the molal ratio of mono-acid halide to dihydric phenol is 1:1, and where this ratio is 1:1 or greater, resin formation is blocked. Similarly, another way of expressing this limiting proportion of mono-acid halide is that the ratio of moles of mono-acid halide to halogen atoms in the polyacid halide shall be less than 1:1; if this ratio is 1:1 or greater, no amount of dihydric phenol will produce a resin.

This invention also contemplates resins in which the

groups of the polycarboxylic acid halide are replaced wholly or in part by

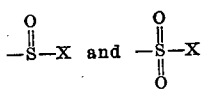

groups. These resins, however, are not so valuable as those prepared from polycarboxylic acid halides. They are frequently darker in color, have poorer water resistance and poorer solubilities. They are nevertheless new and useful for many purposes. The following compounds may be given as examples of suitable disulfone chlorides: $(CH_2)_4(SO_2Cl)_2$, p-benzene disulfonic acid chloride, toluene disulfonic acid chlorides, methane disulfone chloride (the diacid chloride of methane disulfonic acid), and the sulfone chlorides of naphthalene 2,6-disulfonic acid, diphenyl 4,4' disulfonic acid, benzene 1,3,6-trisulfonic acid, the naphthalene trisulfonic acids, and the naphthol disulfonic acids.

The following compounds may be given as examples of compounds containing

group and

group; the mixed sulfone chloride-carboxylic acid chlorides of o-sulfobenzoic acid, p-sulfobenzoic acid, and 1,2-sulfonaphthoic acid.

The mixed sulfinic acid chloride-carboxylic acid chloride of 1,2-sulfinic naphthoic acid may be given as an example of a suitable compound containing a

and an

group.

The benzene sulfonic acid chlorides and sulfinic acid chlorides are typical of suitable monosulfonic and monosulfinic acid chlorides which can be used as modifiers. p,p'-benzene disulfinic acid is a typical disulfinic acid chloride.

This invention also contemplates, though in a definitely less preferred way, resins in which the polyhydric phenol is replaced in part by a polyhydric and/or a monohydric alcohol. Suitable polyhydric alcohols are glycerol, ethylene glycol, diethylene glycol, pentaerythritol, castor oil, dimethyl-dimethylolmethane, and the monoethyl ether of glycerol. Suitable monohydric alcohols are butyl alcohol, dodecyl alcohol, benzyl alcohol, cyclohexyl alcohol, ethyl lactate, diethyl ether of glycerol, monoethyl ether of glycol, monobutyl ether of diethylene glycol, etc. The alcohols will react as readily with acid chlorides as will phenols, resulting in the formation of ester linkages. On the contrary, the polycarboxylic acid halide cannot be successfully replaced by any polycarboxylic, monocarboxylic, polysulfonic, or monosulfonic acid or derivative thereof other than the acid halide, inasmuch as only the acid halide will combine readily with the phenolic hydroxyl. However, in those cases where the polyhydric phenol is partially substituted by an alcohol, the organic polybasic acid chloride may be partially substituted by a carboxylic acid. Suitable acids for this purpose are phthalic, adipic, maleic, citric, diphenic, hexahydrophthalic, quinolinic, butyric, oleic, stearic, benzoic, abietic, cottonseed oil acids, coconut oil acids, soya bean oil acids, linseed oil acids, and China-wood oil acids, and phenyl stearic acid.

Fatty oils can be introduced into the resin by replacing a portion of the polyhydric phenol with a product obtained by heating a fatty oil, e. g., linseed oil, with a polyhydric alcohol, e. g., glycerol, this latter procedure resulting in a partially acylated polyhydric alcohol, i. e., a polyhydric alcohol having only a part of its hydroxyl groups esterified.

The new resins are suitable for a wide variety of uses. As coating compositions they may be used alone or blended by heating, by mutual solvents, or by other means with one or more of the following: cellulose derivatives, such as nitrocellulose, cellulose acetate, ethyl cellulose, and benzyl cellulose; natural resins, such as rosin, Kauri, and damar; natural resin derivatives, such as hydrogenated rosin, ethyl abietate, ester gum, and Congo glycolide; drying oils such as linseed, China-wood, etc.; other synthetic resins, such as polyhydric alcohol-polybasic acid, amine-aldehyde, phenol-aldehyde, and vinyl; and bitumens, such as natural or processed asphalts. To the new resins, either alone or combined with the above substances, I may add pigments, fillers, lakes, plasticizers, solvents, etc., as needed and desired, in accordance with methods known to the art. Any of the known methods of applying the finish, such as spraying, brushing, baking, air-drying, etc., may be employed.

Other valuable uses for the new resins are as follows: molding plastics, either with or without fillers; binding agents for mica in the manufacture of insulating materials; the sandwiching material or adhesive therefor in making shatterproof glass; binding agents for sheets of cellulose acetate and the like in the manufacture of laminated sheet and tube products; cements and adhesives for general use; impregnating, sizing coating, glazing, or water-proofing agents for fabrics, regenerated cellulose, paper, porous stone, wood pulp and bibulous materials of all kinds; and binders for linoleum plastics. Any of the combinations included in the above paragraph on coating compositions can also be employed for any of these other purposes.

As many apparently widely different embodiments of this invention may be made without departing from the spirit and scope thereof, it is to be understood that I do not limit myself to the specific embodiments thereof except as defined in the following claims.

I claim:

1. Process for making resins which comprises reacting a polyhydric phenol and a dibasic acid halide in which the two acid halide groups are separated by a divalent aliphatic hydrocarbon radical containing a chain of at least four carbon atoms between the acid halide groups, said polyhydric phenol having the general formula

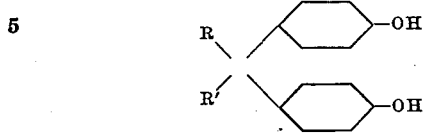

R being hydrogen, alkyl, or aryl, and R' being alkyl or aryl.

2. A process for making synthetic resins which comprises reacting a polyhydric phenol, an organic polybasic acid halide, and at least one member of the group consisting of a monohydric phenol and an organic monocarboxylic acid halide, said polyhydric phenol having the general formula

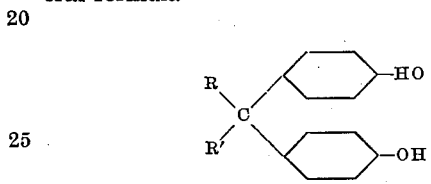

R being hydrogen, alkyl, or aryl, and R' being alkyl or aryl.

3. A process for making synthetic resins which comprises reacting a polyhydric phenol, an organic polybasic acid halide, and an alcohol, said polyhydric phenol having the general formula

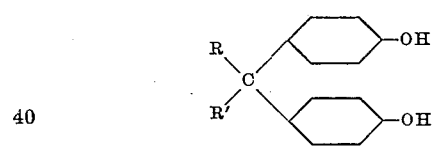

R being hydrogen, alkyl, or aryl, and R' being alkyl or aryl.

4. A process for making synthetic resins which comprises reacting a polyhydric phenol, an organic polybasic acid halide, and a polyhydric alcohol partially acylated with fatty oil acid, said polyhydric phenol having the general formula

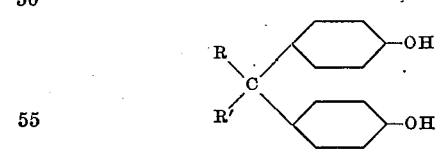

R being hydrogen, alkyl, or aryl, and R' being alkyl or aryl.

5. A process for making synthetic resins which comprises reacting a polyhydric phenol, an organic polybasic acid halide, an alcohol and a carboxylic acid, said polyhydric phenol having the general formula

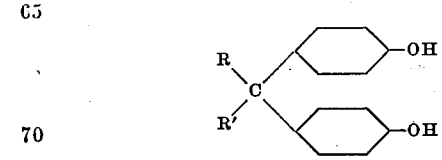

R being hydrogen, alkyl, or aryl, and R' being alkyl or aryl.

6. The process set forth in claim 1 in which the dibasic acid halide is a dicarboxylic acid halide.

7. A process for making synthetic resins which comprises reacting a poly-carboxylic acid halide and a phenol of the general formula:

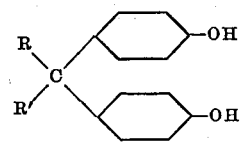

R being hydrogen, alkyl, or aryl, and R' being alkyl or aryl.

8. The process set forth in claim 7 in which the phenol carries ring substituents selected from the class consisting of alkyl groups and halogen.

9. A process which comprises adding an aliphatic polybasic acid chloride to a solution of a metal salt of a polyhydric phenol, and heating to resinification, said phenol having the general formula

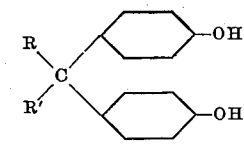

R being hydrogen, alkyl, or aryl, and R' being alkyl or aryl.

10. A process which comprises adding an aliphatic polybasic acid chloride to a solution of polyhydric phenol in an inert organic solvent, and heating to resinification, said phenol having the general formula

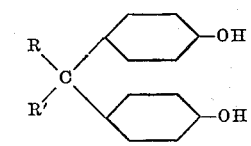

R being hydrogen, alkyl, or aryl, and R' being alkyl or aryl.

11. The resinous reaction product of a polyhydric phenol and a dibasic acid halide in which the two acid halide groups are separated by a divalent aliphatic hydrocarbon radical containing a chain of at least four carbon atoms between the acid halide groups, said polyhydric phenol having the general formula

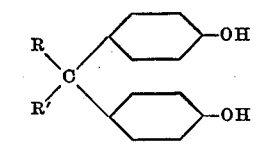

R being hydrogen, alkyl, or aryl, and R' being alkyl or aryl.

12. The resinous reaction product of a polyhydric phenol, an organic polybasic acid halide, and one of the group consisting of a monohydric phenol and an organic monocarboxylic acid halide, said polyhydric phenol having the general formula

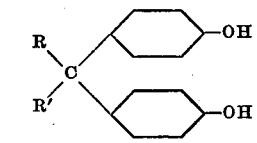

R being hydrogen, alkyl, or aryl, and R' being alkyl or aryl.

13. The resinous reaction product of a polycarboxylic acid halide and a polyhydric phenol of the general formula:

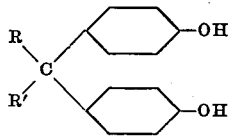

R being hydrogen, alkyl, or aryl, and R' being alkyl or aryl.

14. The resinous reaction product of a polyhydric phenol, an organic polybasic acid halide and an alcohol, said polyhydric phenol having the general formula

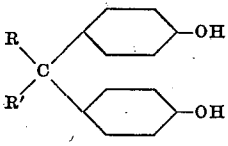

R being hydrogen, alkyl, or aryl, and R' being alkyl or aryl.

15. A synthetic resin which, on saponification with alkali, yields a mixture of products comprising an alkali salt of an organic polybasic acid and a phenol of the formula given in claim 13.

16. The process set forth in claim 3 in which the polybasic acid halide is a polycarboxylic acid halide.

17. The process set forth in claim 4 in which the polybasic acid halide is a polycarboxylic acid halide.

18. The process set forth in claim 5 in which the polybasic acid halide is a polycarboxylic acid halide.

19. The resinous reaction product of polyhydric phenol, an organic polybasic acid halide, and a polyhydric alcohol partially acylated with fatty oil acid, said polyhydric phenol having the general formula

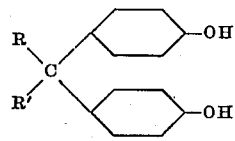

R being hydrogen, alkyl, or aryl, and R' being alkyl or aryl.

20. The resinous reaction product set forth in claim 19 in which the polybasic acid halide is a polycarboxylic acid halide.

21. The resinous reaction product of polyhydric phenol, an organic polybasic acid halide, an alcohol and a carboxylic acid, said polyhydric phenol having the general formula

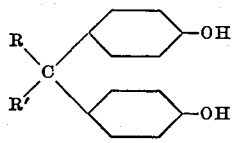

R being hydrogen, alkyl, or aryl, and R' being alkyl or aryl.

22. The resinous reaction product set forth in claim 21 in which the polybasic acid halide is a polycarboxylic acid halide.

23. The resinous reaction product set forth in claim 14 in which the polybasic acid halide is a polycarboxylic acid halide.

24. The resinous reaction product of ingredients comprising essentially a polyhydric phenol and an aliphatic dicarboxylic acid halide of the formula $X-CO-(CH_2)_n-CO-X$, $n$ being at least 4 and X being a halogen atom, said polyhydric phenol having the general formula

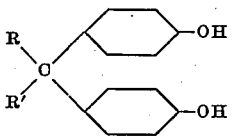

R being hydrogen, alkyl, or aryl, and R' being alkyl or aryl.

FREDERICK CARVER WAGNER.